United States Patent [19]

Inoue

[11] Patent Number: 4,682,016

[45] Date of Patent: Jul. 21, 1987

[54] PEN-TYPE BAR CODE READER

[75] Inventor: Toshiyuki Inoue, Yamanashi, Japan

[73] Assignee: Nisshin Kohki Co., Ltd., Nagano, Japan

[21] Appl. No.: 753,197

[22] Filed: Jul. 9, 1985

[30] Foreign Application Priority Data

Jul. 20, 1984 [JP] Japan ............................ 59-109848[U]

[51] Int. Cl.$^4$ .............................................. G06K 7/10
[52] U.S. Cl. .................................... 235/462; 235/472; 250/555; 250/566
[58] Field of Search ................ 235/462, 472; 250/555, 250/566

[56] References Cited

U.S. PATENT DOCUMENTS 4,346,292 8/1982 Routt et al. ...................... 235/462 X
4,431,912 2/1984 Dickson et al. ................. 235/462 X
4,570,057 2/1986 Chadima et al. ................ 235/462 X Primary Examiner—David L. Trafton
Attorney, Agent, or Firm—Flynn, Thiel, Boutell & Tanis

[57] ABSTRACT

A pen-type bar code reader uses a reflector formed on a concave lens surface of a convex lens system with respect to a bar code detector, except a region for transmitting a light flux. The convex lens system is mounted so that its optical axis is angled with respect to the light flux from the detector, and a bar code illuminating light source is provided in a position between the detector and the convex lens system and opposite to the light flux from the detector with respect to the optical axis of the convex lens system.

6 Claims, 4 Drawing Figures

PEN-TYPE BAR CODE READER

FIELD OF THE INVENTION

This invention relates to a pen-type bar code reader that reads combinations of bar codes on packages of merchandise to distinguish or discriminate one from another.

DESCRIPTION OF THE PRIOR ART

Pen-type bar code readers in general comprise a detector including a light transmitter provided at one end of a generally pen-shaped holder, an illuminator for illuminating bar codes transmitted through the light transmitter, and a bar code analyzer including a receptor for reading the illuminated bar codes.

A known illuminator comprises a reflector having a light flux passage hole and mounted between the detector and the receptor, with the passage hole positioned in the light flux path and with the reflective surface opposed to the detector, so that a light source such a small lamp or light emitting diode positioned between the reflector and the detector and aside the light flux path projects light rays to the reflector which in turn reflects the light rays back to the detector. If the reflector is a concave mirror, an imaging lens for focusing the image of the bar codes at the receptor is positioned behind the concave mirror. If the reflector is a flat mirror, the imaging lens is positioned between the optical axis and the flat mirror. In the illuminator using a concave mirror, light rays from the light source are concentrated and projected to the detector by the concave mirror. In the illuminator using the flat mirror, light rays from the light source are applied to the flat mirror through the lens, reflected back by the lens and concentrated and projected to the detector through the lens. In both illuminators, the reflector is provided independently from a convex lens system provided for bar codes detection.

Another known illuminator uses a lens having a specific configuration for illumination, and Japanese Patent Preliminary Publication No. 79368/1981 teaches the use of light fibre or small ruby ball lens in the illuminator.

However, the prior art illuminator using such an imaging lens increases the number of component parts because the reflector is a separate member independent from the imaging lens, and increases the manufacturing and assembling process because the reflector must be provided with the hole permitting a detection light flux from the detector to pass through. Beside this, the light flux transmitting hole must be larger in practice than a size large enough to simply pass the light flux therethrough so as to remove scattered light produced by the inner circumferencial edge of the hole, and this decreases the effective reflective area of the reflector. Another prior art illuminator using light fibre or a small ruby ball lens increases the manufacturing cost.

OBJECT OF THE INVENTION

It is therefore an object of the invention to provide a pen-type bar code reader omitting a separate reflector and commonly using a convex lens system itself as a reflector, thereby reducing the number of component parts, manufacturing process and manufacturing cost of the bar code reader.

SUMMARY OF THE INVENTION

In accordance with the invention, there is provided a pen-type bar code reader comprising: a generally pen-shaped holder; a bar code detector provided at one end of said holder and spaced from said bar code detector; a convex lens system provided within said holder and interposed between and spaced from said bar code reader and said receptor, said convex lens system being disposed so that the optical axis thereof is angled with respect to the center line of a detection light flux from said bar code detector to said receptor; a bar code illumination light source provided within said holder and disposed at a position between said convex lens system and said detector and symmetric to said light flux with respect to said optical axis; and a reflector provided on a concave surface of said convex lens system with respect to said detector, except a region for transmitting said detection light flux, to concentrate or focus light rays from said light source to said detector.

The lens system may be in the form of a single lens or a combination of some lenses united together. When a single lens is used, the reflective surface is formed on a concave lens surface with respect to the detector, namely a surface of the lens curving toward the receptor and away from the detector. When a combination of some lenses is used, the reflective surface is formed on a concave surface of one of the lenses with respect to the detector. For example, if the convex lens system is a combined unit including a biconvex lens and a meniscus lens, the reflective surface may be formed on one of surfaces of the lenses opposed to or contacting the other, or alternatively on the other surface of the meniscus lens curved toward and nearer to the receptor. The reflective surface may be formed by aluminum vapor deposition on a selected lens surface.

The invention will be better understood from the description given below, referring to some preferred embodiments illustrated in the drawings.

DETAILED DESCRIPTION

Figure 1:
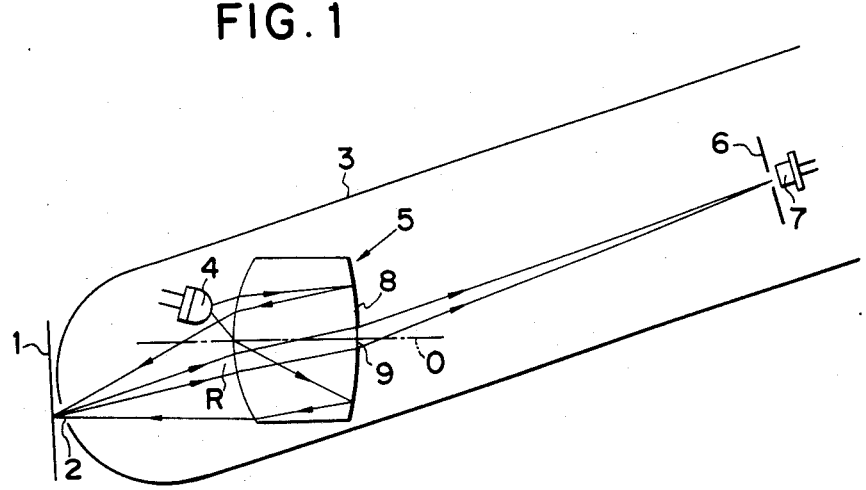
FIG. 1 is a simplified cross-sectional view of a pen-type bar code reader embodying the invention.

Referring to FIG. 1, a pen-type holder 3 is provided at one end thereof with a bar code detector 2 including a light transmitter opposed to bar codes. Within the holder 3 and downstream of the detector 2 are provided an illumination light source 4, a convex lens system 5, an aperture 6 and a receptor 7 such as a photo diode which are generally aligned in this order.

The convex lens system 5 is fixed to the holder 3 so that its optical axis 0 is angled with respect to the center light ray of a bar code detection light flux R from the detector 2 to the receptor 7.

A reflective surface made of an aluminum vapor deposition layer is formed on a surface of the convex lens system 5 curved away from the detector 2 and toward the receptor 7, except a region 9 for passage of the detection light flux R from the detector 2.

The light source 4 is positioned opposite to the light flux R with respect to the optical axis 0 of the lens 5 so that light rays from the light source 4 enter the convex lens system 5 and are reflected by the reflective surface 8, and the reflected light rays are concentrated or focused at or near the detector 2 to illuminate the bar codes 1. The illuminated image of the bar codes 1 is focused at the receptor 7 by the convex lens system 5, and the light signals from the bar codes 1 are converted to electric signals by the receptor 7.

Figure 2:
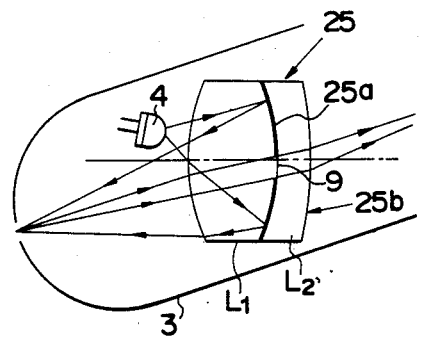
FIG. 2 is a simplified cross-sectional view of a further embodiment of the invention.

FIG. 2 illustrates a further embodiment of the invention in which the convex lens system 5 is a conjoined lens unit 25 with first lens $L_1$ and second lens $L_2$ closely united together, and the reflective surface is formed along the junction 25a between the two lenses. The reflective surface may be formed on any one surface of the lenses along the junction 25a. Alternatively, the reflective surface may be formed on the opposite surace 25b of the second lens $L_2$ bulging toward and nearer to the receptor 7.

Figure 3:
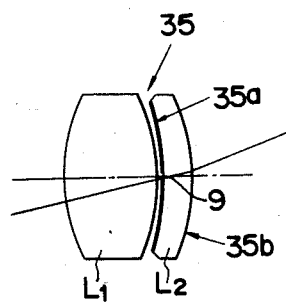
FIG. 3 is a fragmentary cross-sectional view of a still further embodiment of the invention.

FIG. 3 illustrates a still further embodiment of the invention in which the convex lens system 5 is a conjoined lens unit 35 with first lens $L_1$ and second lens $L_2$ opposed to and slightly spaced from each other, and the reflective surface is formed on one surface of the second lens $L_2$ curved away from the detector 2. Alternatively, the reflective surface may be formed on the opposite surface 35b of the second lens $L_2$ bulging toward and nearer to the receptor 7.

Figure 4:
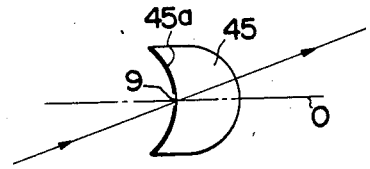
FIG. 4 is a fragmentary cross-sectional view of a yet further embodiment of the invention in which a meniscus lens at 45 is used as a convex lens system, and a reflective surface at 45a is formed on one concave surface opposed and nearer to a detector.

FIG. 4 illustrates a yet further embodiment of the invention in which the convex lens system 5 is a meniscus lens 45, and the reflective surface is formed on one surface curved away from and nearer to the detector 2.

No limitation is incurred by the number of lenses of the convex lens system 5 in selecting a lens surface to be or provided with the reflective surface. Considering the positional relationship between the light source and the detector, one surface curved away from the detector and having a carvature to focus light rays from the light source to the detector is selected to form the reflective surface thereon.

As described above, the invention uses a lens surface of the convex lens system itself as a reflective surface, and therefore attains the expected object by simply providing an angle between the bar code detection light flux and the optical axis of the convex lens system.

I claim:

1. A pen-type bar code reader comprising:
   a generally pen-shaped holder;
   a bar code detector provided at one end of said holder;
   a receptor provided within said holder and spaced from said detector;
   a convex lens system provided within said holder and interposed between and spaced from said detector and receptor, said convex lens system being disposed so that the optical axis thereof is angled with respect to the center ray of a detection light flux from said bar code detector to said receptor;
   a bar code illumination light source provided within said holder and disposed at a position between said convex lens system and said detector and symmetric to said light flux with respect to said optical axis; and
   a reflector provided on a surface of said convex lens system curved away from said detector, except a region for transmitting said detection light flux, to concentrate or focus light rays from said light source to said detector.

2. A pen-type bar code reader of claim 1 wherein said convex lens system is a single lens.

3. A pen-type bar code reader of claim 1 wherein said convex lens system is a combination of some lenses united together.

4. A pen-type bar code reader of claim 3 wherein said reflector is formed on one surface of said convex lens system curved away from said detector.

5. A pen-type bar code reader of claim 1 wherein said reflector is a vapor deposition layer deposited on a lens surface of said convex lens system.

6. A pen-type bar code reader of claim 2 wherein said single lens is a meniscus lens curved away from said detector, with one surface being provided with said reflector.

* * * * *